M. F. WILLIAMS.
FEEDING MECHANISM FOR SHREDDERS OR PULVERIZERS.
APPLICATION FILED AUG. 28, 1911.
1,048,621.
Patented Dec. 31, 1912.
2 SHEETS—SHEET 1.
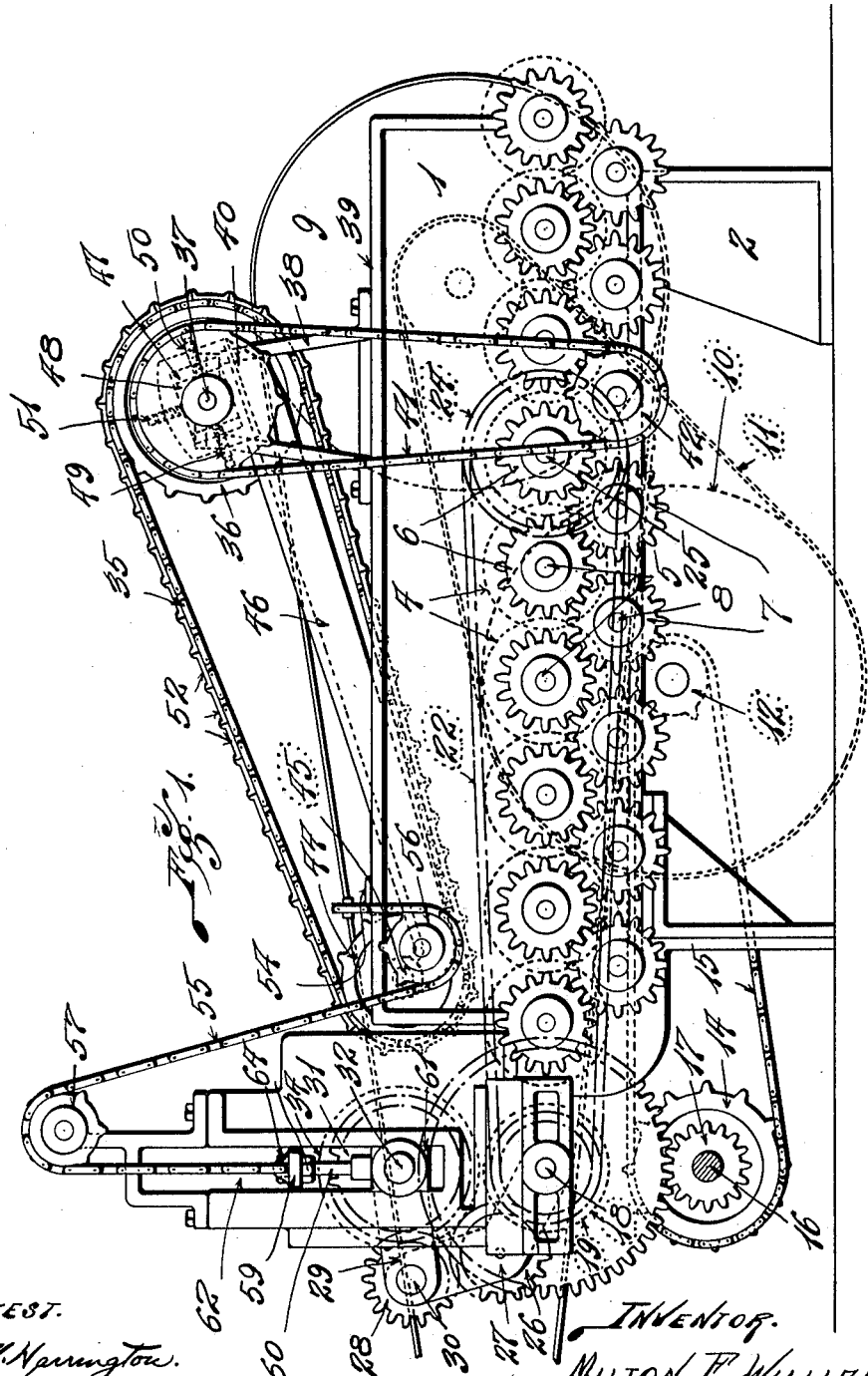

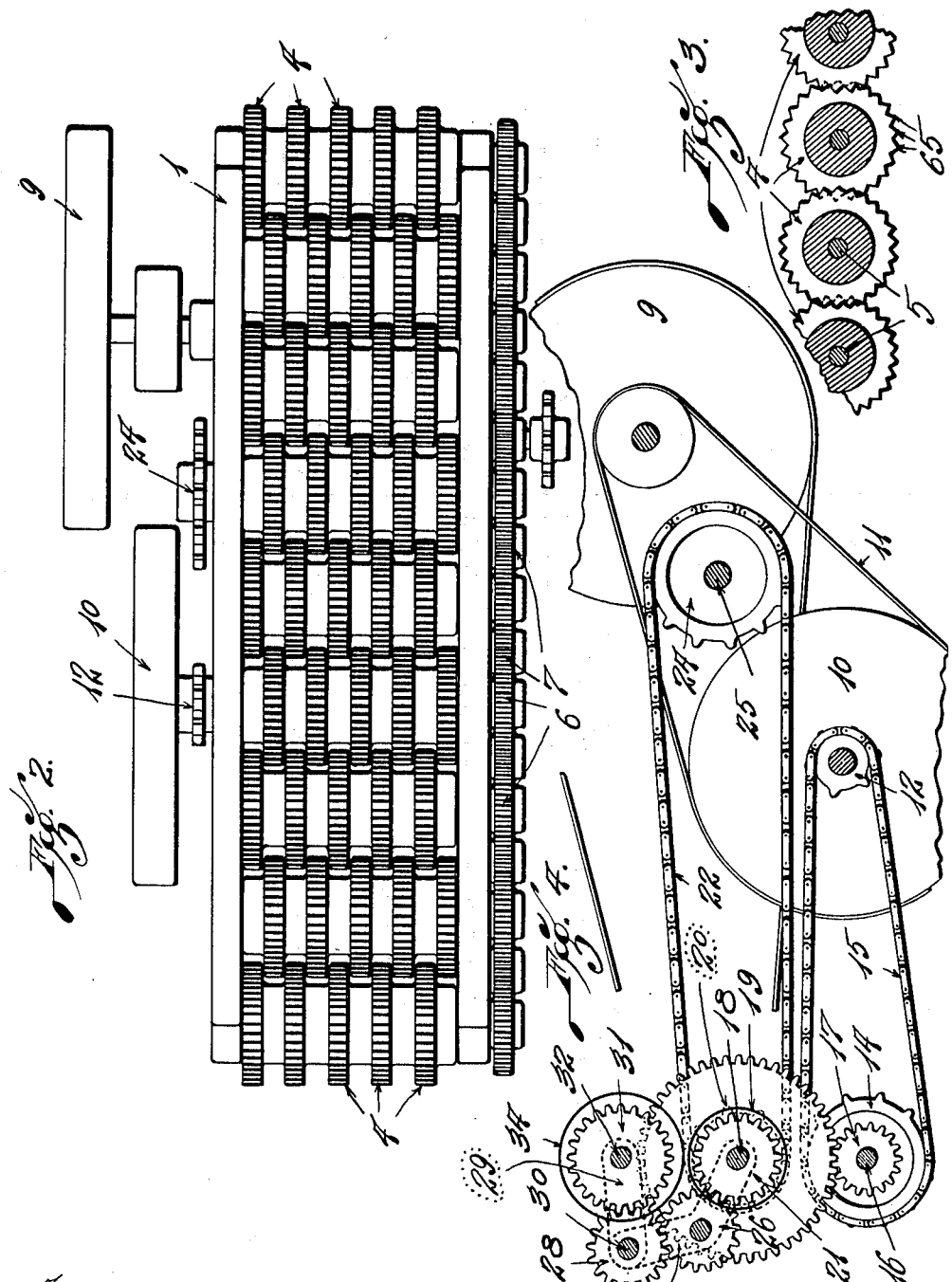

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, OF ST. LOUIS, MISSOURI, A CORPORATION.

FEEDING MECHANISM FOR SHREDDERS OR PULVERIZERS.

1,048,621.  Specification of Letters Patent.  Patented Dec. 31, 1912.

Application filed August 28, 1911. Serial No. 646,528.

*To all whom it may concern:*

Be it known that I, MILTON F. WILLIAMS, a citizen of the United States, residing at St. Louis, Missouri, have invented a certain new and useful Improvement in Feeding Mechanism for Shredders or Pulverizers, of which the following is a full, clear, and exact description, such as will enable others skilled in the art to which it appertains to make and use the same, reference being had to the accompanying drawings, forming part of this specification, in which—

Figure 1 is an elevational, detail view illustrating the driving device for the feeding mechanism. Fig. 2 is a detail plan view of the roller feed table. Fig. 3 is a sectional, elevational, detail view of the roller feed table. Fig. 4 is an elevational, detail view of certain of the driving gearing.

This invention relates broadly to feeding hoppers or troughs, and more specifically to a feeding trough or hopper particularly adapted to be used in connection with crushers or shredders.

The principal object of this invention is to construct a feed trough using the combination of a roller feed table, a belt feed conveyer, and adjustable feed rolls.

Another object of my invention is to render the upper feed roll adjustable by the movement of the feed belt whereby the feed roll may be adjusted to accommodate whatever quantity of material is being fed beneath the belt.

Still other and further objects of this invention will in part be obvious, and will in part be pointed out in the specification hereinafter following by reference to the accompanying drawings.

Referring to the drawings, and more particularly to Fig. 1, the feed hopper 1 is supported upon the brace frames 2 and carries a series of feed rollers 4, indicated in Fig. 1, in dotted lines. The feed rolls 4 are carried upon shafts 5, which are journaled in the feed hopper 1, and which carry upon their outer ends a series of cogged pinions 6. The cogged pinions 6 are of such a size as to permit of considerable clearance between each pinion in a series. A second series of cogged pinions 7 are mounted upon stub shafts 8 that are carried by the feed hopper 1. The second series of pinions 7 are so arranged as to have a considerable clearance between each particular pinion of the individual series, and are adapted to intermesh between the series of driving pinions 6 in such manner as to cause each of the driving pinions to be rotated in the same direction.

Referring more particularly to Fig. 4, a belt wheel 9 is mounted upon the feed hopper 1, and is adapted to drive a secondary belt wheel 10 by means of a belt 11. The secondary belt wheel carries a reducing pinion 12, which in turn is connected with a sprocket wheel 14 by means of a chain belt 15. The sprocket wheel 14 is carried upon a shaft 16 upon which is fixedly mounted a cog gear 17. The cog gear 17 meshes with a large gear wheel, which is mounted upon a shaft 18 that carries an end feed roll 19, indicated in Fig. 1 in dotted lines.

The shaft 18 carries upon one end a chain sprocket wheel 20, and upon its other end a driving cog 21. The chain sprocket wheel 20 is connected by means of a drive chain 22, with a sprocket 24 carried upon a shaft 25, upon which is mounted one of the feed rolls 4. The cog pinion 6, carried upon the shaft 25, is the master cog for the series of driving cogs 6 that are adapted to operate the feed rolls 4. The driving cog 21, which is also carried upon shaft 18, is in constant mesh with an idler gear 26, that is mounted upon an elbow arm 27, which also carries the idler reversing gear 28. A link arm 29 is pivotally connected with the elbow arm 27 and turns about the stub shaft 30, upon which the idler reversing gear 28 is mounted to turn. The idler reversing gear is in constant mesh with the gear 31, and is fixedly mounted upon the shaft 32, which carries the upper feeding roll 34. The upper feeding roll 34 is mounted for vertical movement by a mechanism which will be more fully described hereinafter, and, therefore, in view of the fact that the upper feed roll 34 is geared to revolve at the same speed as the lower feeding roll 19 it becomes necessary that the idler gears 26 and 28 must be so arranged as to be in constant mesh with the driving gear 21 and with the driven gear 31 at the same time. The idler gears 26 and 28 must be maintained in mesh with each other. It will be noted that as the upper feeding roll 34 is mounted in vertical adjustment with reference to the lower feeding roll 19, that the elbow arm 27 and the link arm 29 swing in such manner as to maintain the gears 21, 26, 28 and 31 in proper and constant mesh with each other.

Again referring more particularly to Fig. 1, the upper feed comprises a chain belt 35, which is arranged in duplicate, (only one of the chains being shown) and passes over a driving sprocket 36 that is mounted upon the upper driving shaft 37. The upper driving shaft 37 is journaled in brackets 38, which are bolted to the upper rib 39 of the feed hopper 1. A chain sprocket 40 is mounted upon the upper driving shaft 37, and is driven by means of a belt chain 41, which passes over a sprocket wheel 42, that is formed integral with one of the secondary pinions 7. The chain belts 35 extend forwardly and downwardly and pass over some end sprockets 44, that are mounted upon a shaft 45, which is journaled in an extension frame 46. The extension frame 46 is mounted to pivot about the driving shaft 37 in such manner as to allow an up and down movement of the forward end carrying the sprockets 44. The extension frame 46 at its upper end is provided with an open slot 47 in which the journal block 48 is adjustably mounted by means of opposed screws 49 and 50. A stub screw 51 passes through the upper wall of the extension frame 46 and into the slot 47 in such manner as to permit the journal block 48 being tightly clamped in any adjusted position. The primary object of the slot 47 and opposed screws 49 and 50 being to operate as a belt tightener whereby to properly adjust the chain belts 35. The chain belts 35 carry upon their exterior faces a continuous series of transverse channel bars 52, which form the feeding slats for the upper conveyer. The upper conveyer extension frame 46 carries a transverse bar 54, upon which is fixedly mounted one end of a feed control chain 55. The feed control chain passes downwardly from the transverse bar 54 under a sheave sprocket 56, which is fixedly mounted upon the side frame of the feed hopper 1, and then passes up and over a sheave sprocket 57, that is mounted upon an extension frame 58. From the sheave sprocket 57 the feed control chain 55 passes downwardly, and is fixedly connected with the lift bar 59. Adjustment rods 60 are adapted to carry journal blocks 61, which are slidably mounted in the guideways 62, and which carry the upper feeding roll 34. The adjustment rods 60 are adapted to pass through openings in the lift bar 59, and are provided with adjustment nuts 64 on each side of the lift bar 59 in such manner as to permit a vertical adjustment of the lift bar 59 with relation to the upper feeding roll 54.

Referring more particularly to Figs. 2 and 3, it will be noted that the lower roller feed comprises a series of feed rolls 4, each of which is provided with feeding faces 65, which are arranged in stepped series from beginning to end of the roll, the feeding faces of each roll being so arranged that one end of the roll comprises a feeding face while the other end of the roll is a blank space. Thus it will be noted that by arranging the rolls in alternation, as is clearly disclosed in Fig. 2, the feeding faces interpose between each other in the manner as is indicated in Fig. 3, to form an overlapping, and, therefore, continuous feed table. By this arrangement of feed roll it will be noted that the roll may be made from a single mold, and that each roll in a series is a duplicate of every other roll.

Having thus described my invention, what I claim is:

In a device of the class described, lower feeding mechanism, upper feeding mechanism adjustable with reference to said lower feeding mechanism, a lower feeding roll at one end of said lower feeding mechanism, an upper feeding roll adjustable with reference to said lower feeding roll, and flexible means connecting said upper feeding roll and said upper feeding mechanism, whereby the adjustment of the one is directly controlled by the adjustment of the other.

In testimony whereof I hereunto affix my signature in the presence of two witnesses, this 24th day of August, 1911.

MILTON F. WILLIAMS.

Witnesses:
M. P. SMITH,
JESSIE CLARK.

---

Copies of this patent may be obtained for five cents each, by addressing the "Commissioner of Patents, Washington, D. C."